(12) United States Patent
Irwin, Sr.

(10) Patent No.: US 7,364,634 B1
(45) Date of Patent: Apr. 29, 2008

(54) CARPET CONSTRUCTION HAVING SECONDARY BACKING

(75) Inventor: Donald A. Irwin, Sr., Dalton, GA (US)

(73) Assignee: Darwin Enterprises, Dalton, GA (US)

( * ) Notice: Subject to any disclaimer, the term of this patent is extended or adjusted under 35 U.S.C. 154(b) by 0 days.

(21) Appl. No.: 11/499,471

(22) Filed: Aug. 7, 2006

(51) Int. Cl.
*D05C 15/04* (2006.01)
*B32B 37/04* (2006.01)

(52) U.S. Cl. ............... 156/72; 156/308.2; 156/324; 156/324.4; 428/95; 428/96; 428/97

(58) Field of Classification Search ............... 156/72, 156/292, 308.2, 309.6, 324, 324.4; 428/95, 428/96, 97
See application file for complete search history.

(56) References Cited

U.S. PATENT DOCUMENTS

| | | | |
|---|---|---|---|
| 3,285,797 A * | 11/1966 | Harrison et al. ............... 428/95 |
| 4,171,395 A | 10/1979 | Tillotson | |
| 4,405,393 A | 9/1983 | Tillotson | |
| 4,844,765 A | 7/1989 | Reith | |
| 5,536,551 A * | 7/1996 | Woosley ............... 428/92 |
| 5,958,527 A | 9/1999 | Prevost | |
| 5,962,101 A | 10/1999 | Irwin, Sr. et al. | |
| 6,264,775 B1 | 7/2001 | Holeschovsky et al. | |
| 6,299,715 B1 | 10/2001 | Langsdorf et al. | |
| 6,338,885 B1 | 1/2002 | Prevost | |
| 6,475,592 B1 | 11/2002 | Irwin | |
| 6,479,125 B1 | 11/2002 | Irwin, Sr. | |
| 6,551,689 B1 | 4/2003 | Prevost | |
| 6,689,447 B2 | 2/2004 | Prevost | |
| 6,723,412 B2 | 4/2004 | Prevost | |
| 6,767,595 B2 | 7/2004 | Prevost et al. | |
| 6,849,565 B1 * | 2/2005 | Gardner et al. ............... 442/35 |
| 6,877,932 B2 | 4/2005 | Prevost | |
| 6,989,179 B2 | 1/2006 | Prevost et al. | |
| 2002/0172795 A1 * | 11/2002 | Gardner et al. ............... 428/85 |

FOREIGN PATENT DOCUMENTS

JP 51047166 A * 4/1976
WO WO9514806 A1 6/1995

* cited by examiner

*Primary Examiner*—Jeff H. Aftergut
*Assistant Examiner*—Michael A Tolin
(74) *Attorney, Agent, or Firm*—David J. Hill; Chambliss Bahner & Stophel

(57) ABSTRACT

A tufted carpet includes a primary backing having a back side and a face side, and a secondary backing. The carpet includes tufts of yarn sewn through the primary backing so as to be exposed on the face side and to form a plurality of back stitches on the back side. The yarn of the tufted carpet is a thermoplastic material having a yarn melting point. The secondary backing is a thermoplastic material in the form of a fluid-impervious film or a fabric having a softening temperature that is no lower than the yarn melting point, or a laminate having an inner and an outer layer, in which the outer layer comprises a thermoplastic material having a softening temperature that is no lower than the yarn melting point. A method for making such a tufted carpet includes the steps of bringing the secondary backing into contact with at least some of the back stitches on the back side of the primary backing, and heating the combination of the primary backing and the secondary backing to a temperature sufficient to adhere the secondary backing to the back stitches without melting the secondary backing.

6 Claims, 6 Drawing Sheets

CARPET CONSTRUCTION HAVING SECONDARY BACKING

CROSS REFERENCE TO RELATED APPLICATION

This application claims the benefit of application Ser. No. 10/767,830, which was filed on Jan. 29, 2004 now abandoned, which in turn claims the benefit of U.S. Provisional Application No. 60/443,270, filed on Jan. 30, 2003.

FIELD OF THE INVENTION

This invention relates generally to carpet products such as carpets and carpet tiles, as well as synthetic grass carpets for athletic and landscape use. More specifically, the invention relates to such products which include a secondary backing comprising a film, fabric or laminate that is applied to the back of the primary backing without requiring a separate adhesive.

BACKGROUND AND DESCRIPTION OF THE PRIOR ART

Carpets are generally produced by tufting carpet yarns into and through a primary backing which is comprised of a woven or non-woven material or a combination of such materials. The tufting process will generally produce an intermediate product comprised of loops of yarn which protrude through a "face" side of the primary backing and are retained by a plurality of "back stitches" on the back side of the primary backing. The carpet loops which protrude through the primary backing may then trimmed to leave cut pile yarns on the carpet face, or they may be left as loop pile. In either event, the back stitches on the back side of the primary backing are generally covered with a back coating adhesive material to provide "fiber lock" so that the fibers of the tufts are retained together, and "tuft bind" so that the tufts cannot be easily pulled through the backing. It is common for the back coating material to be applied in liquid form by direct coating, and frequently, a secondary backing of jute or other woven material such as ActionBac® woven polypropylene backing is then applied over the back coating material. The primary and secondary backings are typically pressed together between a pair of lamination press rolls, and the greige good, the intermediate product comprising the primary backing with yarn tufted therethrough, the back coating material and the secondary backing, is then heated or subjected to a chemical or other treatment to cure or fix the back coating in a solid state, thereby binding the primary backing and the secondary backing together by means of the back coating material. In some cases, no secondary backing is applied, and the back coating is solidified after application to the primary backing. In other cases, the back coating is solidified after application to the primary backing, and a secondary backing is applied to the solidified back coating on the primary backing using a separate adhesive material.

Styrene butadiene rubber ("SBR") latex with various fillers is commonly used as a back coating material. This material is cured by heating which causes the evolution of water vapor from the SBR latex, thereby changing it from a liquid form into a solid. Since SBR latex generally maintains its viscosity and tackiness during processing, the greige good is usually conveyed through a curing oven with the "face" side up. Other natural and synthetic latex materials, including ethylene vinyl acetate and acrylic, may also be used in a similar manner.

Non-latex adhesive materials have also been used as back coatings or adhesives for secondary backings. Such materials include polyurethanes, hot melt adhesives of various compositions, polyvinylchloride and meltable powders. Such coatings may be applied to greige goods by use of conventional carpet coaters; however, greige goods with such coatings are generally conveyed face down through a curing oven. Polyurethane coatings were introduced during the early 1970's by Union Carbide Corporation. (see *Journal of Cellular Plastics*, Vol. II, No. 6, Nov/Dec, 1975). Shortly thereafter, Dow Chemical also produced and marketed a polyurethane coating. (see *Review Crosstalk*, Vol. 43, No 3, June 1993). The use of polyurethane coatings requires expensive handling equipment for application to the primary backing or back coating on the primary backing. Polyurethane coatings are principally used as unitary coatings on synthetic grass products and on carpet precoated with urethane foams for residential and commercial use. However, U.S. Pat. No. 6,299,715 of Langsdorf et al. describes the application of a reactive urethane back coating and the lamination of a secondary backing to the primary backing using press rolls much like in the conventional latex coating operation. Because polyurethane coatings are generally less viscous than latex coatings (and consequently susceptible to dripping), the coating is applied to the carpet, and the carpet is conveyed through the curing oven in a face down orientation. U.S. Pat. No. 6,264,775 of Holeschovsky et al. describes a use of a urethane adhesive which includes non-Newtonian thickeners that reduce the likelihood of dripping, thereby permitting the processing of carpet by passing it through a curing oven in a face-up orientation, as in most latex operations.

U.S. Pat. No. 4,171,395 of Tillotson describes a process for forming a layer of foam urethane on a carpet backing by applying a release film or layer of latex on a Teflon®-coated conveyor belt, curing the latex on the belt using a hot air dryer, pouring a urethane foam reaction mixture onto the cured latex film and shaping it into a layer of specified thickness. The primary backing of a tufted carpet is laid onto the layer of reaction mixture on the release film, and the reaction mixture is then heated to chemically blow foam therefrom by the generation of carbon dioxide in the reaction process. U.S. Pat. No. 4,405,393, also of Tillotson describes a similar process in which an elastomeric film, which may consist of "a layer of an olefin material such as polyethylene or polypropylene, or a layer of polyvinyl chloride or rubber lattices such as natural or synthetic SBR latex rubber", is substituted for the latex release film.

Thermoplastic powders such as polyethylene powders are also used as back coating and adhesive materials. Such powders have been used for some time for automobile carpets; however, they have only recently been used in connection with broadloom carpets. In the late 1990s, Sellers Engineers, Ltd. developed a powder coating for use in applying a woven secondary backing to a primary backing. According to this process, a latex adhesive was applied without any filler to the primary backing. The latex was cured and a polyethylene powder was applied. The powder was heated using infrared heaters to melt it, and then a jute or woven fabric secondary backing was applied and laminated to the primary backing using cold press rolls.

Although latex and thermoplastic powder back coatings and adhesives may provide acceptable fiber lock for a primary backing and acceptable lamination adhesion for a secondary backing, such back coatings are generally porous and do not prevent fluid spills from penetrating from the surface of the carpet through to the carpet pad or cushion and/or to the floor beneath. Such spills may create odors that cannot be removed and provide a haven for bacteria. Therefore, it is frequently desirable to provide a carpet having a fluid barrier that can retain a spill above the carpet pad or flooring (or within the carpet) where it may be easily removed. An effective fluid barrier may be obtained using polyurethane, providing that very high coating weights of at least about 50 ounces per square yard are employed. However, as mentioned above, polyurethanes are expensive and require special handling and processing equipment. Another fluid barrier that may be used is the SPILLNET™ protective barrier that is made and sold by DuPont. However, the SPILLNET™ barrier is not a part of the carpet product but instead comprises a separate plastic sheet that is installed on top of the carpet pad or cushion before installation of the carpet. This increases the cost of the carpet installation, as well as the labor required.

My U.S. Pat. No. 5,612,113 describes a carpet with a fluid barrier comprised of an impervious film that is bonded to the back of the primary backing or to the back of a secondary backing after curing of the latex back coating using a non-aqueous adhesive such as a hot-melt thermoplastic adhesive or a polyurethane. The application of this fluid barrier thus requires a processing step after the normal latex curing step, whether the fluid barrier film is applied over the primary backing or over a secondary backing. My U.S. Pat. No. 5,962,101, No. 6,475,592 and No. 6,479,125 describe multi-layer primary backings which may include a plastic sheet material; however, the plastic sheet material of these primary backings may not provide a fully-effective fluid barrier because it is pierced by the carpet yarns that are tufted through it.

In the production of synthetic grass carpets for athletic and landscape use, it is common to employ a primary backing that is porous or permeable to liquids. Sometimes, a primary backing is mechanically perforated to improve its porosity. Occasionally, a secondary backing is applied to the back side of the primary backing and both backings are perforated simultaneously to allow for the drainage of rain water and other liquids through the carpet.

U.S. Pat. No. 4,705,706 of Avery describes an artificial turf product made of polyethylene yarn and a woven nylon primary backing. The polyethylene yarn is tufted through the woven backing and heat is applied to the back stitches to bond them to the nylon primary backing. The backing may comprise multiple layers in order to allow for infiltration and retention of sand in the carpet; however, no secondary backing is used. The woven primary backing of this outdoor turf product allows water to filter through the sand and the primary backing.

U.S. Pat. No. 5,958,527 of Prévost describes a synthetic grass carpet comprising a plurality of synthetic ribbons that are tufted through a two-ply open weave fabric primary backing. Three infill layers are added, comprising a base course of sand, a middle course of intermixed sand granules and rubber granules, and a top course of rubber granules. U.S. Pat. No. 6,338,885, also of Prévost, describes a similar synthetic grass carpet in which polyethylene or polypropylene ribbons are tufted through a primary backing comprising two layers of woven or needle punched polypropylene fabric. In one embodiment of the carpet product of U.S. Pat. No. 6,338,885, at least a portion of the back side of the primary backing is coated, using a porous back coating material to secure the back stitches to the primary backing. U.S. Pat. No. 6,551,689, also of Prévost, describes a similar synthetic grass carpet in which polypropylene, polyethylene, nylon or plastic ribbons are tufted through a primary backing comprising two or more layers of open weave fabric, one of which may be a dimensionally stable netting. None of the carpets described in the Prévost patents referenced above includes a secondary backing.

It would be desirable if a carpet could be developed which includes a secondary backing comprising a fluid barrier film, a fabric or a laminate that may be applied without the use of a separate adhesive. It would also be desirable if a method or process for manufacturing a carpet with a secondary backing comprising a fluid barrier film, a fabric or a laminate could be developed which would require less expensive equipment and could be carried out at a lower capital cost than known processes. It would also be desirable if a method or process for manufacturing a carpet with a such a secondary backing could be developed which would require less energy and could be carried out at a lower operating cost than known processes. It would be desirable if such process would permit recycling of such carpet by conventional means.

ADVANTAGES OF THE INVENTION

Among the advantages of one embodiment of the invention is that it provides a carpet which includes a secondary backing comprising a fluid barrier film, a fabric or a laminate that may be applied without using a separate adhesive. Another advantage of an embodiment of the invention is that it provides a method or process for manufacturing a carpet with a secondary backing comprising a fluid barrier film, a fabric or a laminate which requires less expensive equipment than conventional methods and consequently can be carried out at a lower capital cost. Still another advantage of an embodiment of the invention is that it provides a method or process for manufacturing a carpet with a secondary backing which requires less energy than conventional methods and consequently can be carried out at a lower operating cost. Another advantage of an embodiment of the invention is that it may be used to produce a carpet that can be recycled by conventional means.

Additional objects and advantages of this invention will become apparent from an examination of the drawings and the ensuing description.

Explanation of Technical Terms

As used herein, the term "adhesive" refers to a material that may be used to bind one material with another, including (but not limited to) such a material that when heated from a solid phase to its melting point, placed into contact with the materials to be bound together and subsequently cooled, may bind two materials together.

As used herein, the term "back" refers to the side of a carpet or carpet component that is nearer to the floor or other surface on which the carpet is laid than is its opposite side. The term "face" refers to the pile of the carpet or the surface of the installed carpet on which fluids may be spilled during normal use.

As used herein, the term "back coating" refers to a material that may be applied to the back or underside of a primary backing through which yarns have been tufted, which material may be employed to cover the back stitches and provide a measure of fiber lock and tuft bind.

As used herein, the term "carpet" refers to a product having a backing through which yarn is tufted. The term "carpet" may include (but is not limited to) carpet tiles and synthetic grass or artificial turf products. The term "carpet tile" may also be used to refer to a square, rectangular or other conveniently shaped piece of carpet that is intended to be laid or placed on a floor in the manner of other flooring tiles.

As used herein, the term "fabric" refers to a woven material of any type, as well as to a non-woven material comprised of fibers and filaments of various lengths and diameters, including (but not limited to) those that have been fusion bonded, needle-punched, stitchbonded, spunbonded or formed into meltblown webs. A "fabric" is generally permeable to fluids.

As used herein, the term "film" refers to a thin sheet of a fluid-impervious material comprised of a single layer of polyethylene, polypropylene, polyurethane, polyester, polyvinylchloride (PVC), nylon, polyethylene vinyl acetate and combinations of these and similar materials.

As used herein, the term "hot melt adhesive" and similar terms refer to a composition of a thermoplastic polymer base with one or more of the following components: (a) diluents to enhance properties such as viscosity and adhesion strength; (b) waxes; (c) plasticizers; and (d) tackifiers.

As used herein, the terms "melting point" and "melting temperature" refer to the temperature at which the solid and liquid phases of a material are in equilibrium.

As used herein, the term "laminate" refers to a structure comprised of two or more sheets or layers of fabric and/or film.

As used herein, the term "softening temperature", when applied to a polymer, refers to a temperature above the glass transition temperature and below the melting point.

As used herein, the term "yarn" and similar terms refer to materials of various types that are tufted through a primary backing to form a carpet. The term "yarn" includes (but is not limited to) materials that are tufted through a primary backing to form a carpet tile, a synthetic grass carpet or an artificial turf product.

SUMMARY OF THE INVENTION

The invention comprises a tufted carpet which includes a primary backing having a face side and a back side and a plurality of tufts of yarn comprised of a material having a yarn melting point. The tufts of yarn are sewn through the primary backing so as to be exposed on the face side of the primary backing and to form a plurality of back stitches on the back side of the primary backing. The carpet also includes a secondary backing comprising a thermoplastic material in the form of a fluid-impervious film or a fabric having a softening temperature that is no lower than the yarn melting point, or a laminate having an inner and an outer layer, said outer layer having a softening temperature that is no lower than the yarn melting point.

The invention also includes a method for making tufted carpet which includes a secondary backing that is applied without requiring a separate adhesive. The method for making tufted carpet includes the conventional step of tufting yarn through the primary backing so as to form face yarns on the face side and a plurality of back stitches on the back side. This method also includes the step of providing a secondary backing comprising a thermoplastic material in the form of a fluid-impervious film or a fabric having a softening temperature that is no lower than the yarn melting point, or a laminate having an inner and an outer layer, said outer layer having a softening temperature that is no lower than the yarn melting point. This method also includes the steps of bringing the secondary backing into contact with at least some of the back stitches on the back side of the primary backing and heating the combination of the primary backing and the secondary backing to a temperature that is sufficient to adhere the secondary backing to the yarn of the back stitches.

In order to facilitate an understanding of the invention, the preferred embodiments of the invention are illustrated in the drawings, and a detailed description thereof follows. It is not intended, however, that the invention be limited to the particular embodiments described or to use in connection with the apparatus illustrated herein. Various modifications and alternative embodiments such as would ordinarily occur to one skilled in the art to which the invention relates are also contemplated and included within the scope of the invention described and claimed herein.

BRIEF DESCRIPTION OF THE DRAWINGS

The presently preferred embodiments of the invention are illustrated in the accompanying drawings, in which like reference numerals represent like parts throughout, and in which.

DESCRIPTION OF THE PREFERRED EMBODIMENTS OF THE INVENTION

Figure 1:
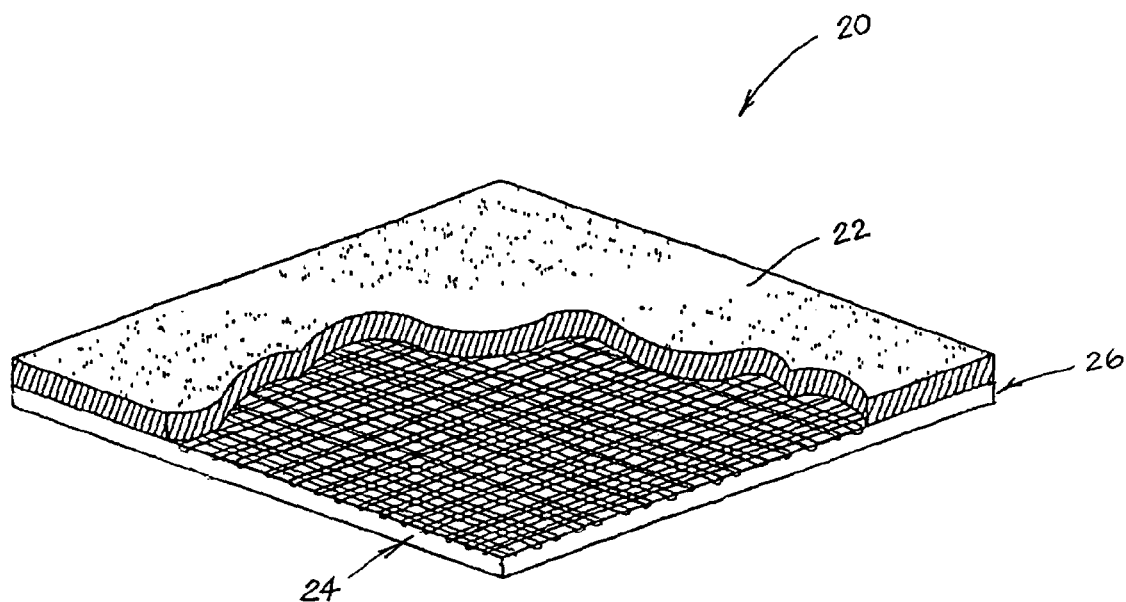
FIG. 1 is a perspective view showing a first embodiment of a piece of carpet or a carpet tile that is made according to the present invention, the carpet being partially broken away to show the construction.
Figure 2:
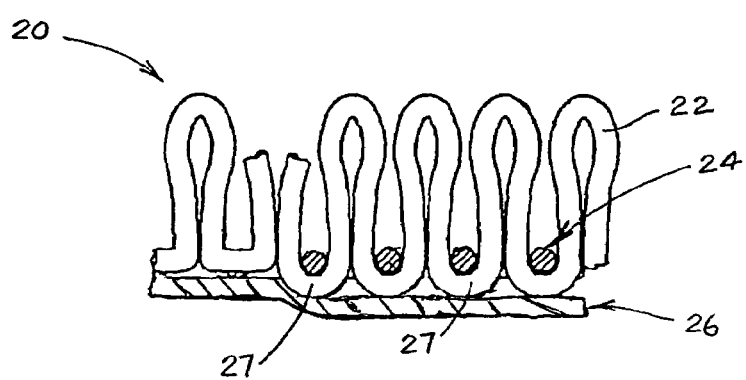
FIG. 2 is a detailed side view of a portion of the carpet of FIG. 1.

As shown in FIGS. 1 and 2, carpet 20, made according to a preferred embodiment of the invention, comprises face yarns formed of a plurality of tufts 22, open weave primary backing 24 and secondary backing 26. The yarn comprises a thermoplastic material having a yarn melting point. Preferably, the thermoplastic material of the yarn is selected from the group consisting of polymers and copolymers of nylon, polyethylene, polypropylene and polyester. Primary backing 24 has a face (or upper) side and a back side, and the tufts 22 of yarns are sewn through the primary backing in the conventional manner. As shown in FIG. 2, the tufts 22 are exposed on the face side of the primary backing for forming face yarns and form a plurality of back stitches 27 on the back side of the primary backing.

As shown in FIG. 2, the primary backing may be comprised of woven polypropylene ribbons such is commonly used in the manufacture of carpet. In the alternative, it may be comprised of other known primary backing materials, including non-woven materials and other single-layer primary backings, and dual-layer primary backings, including those that are described in my U.S. Pat. No. 5,962,101, No. 6,475,592 and No. 6,479,125. The secondary backing of this embodiment of the invention is comprised of a thermoplastic material in the form of a fluid-impervious film or a fabric. The material of the film or fabric has a softening temperature that is no lower than the melting point of the thermoplastic material of the yarn. It is preferred that the secondary backing comprise a thermoplastic material selected from the group consisting of polymers and copolymers of polyethylene, polypropylene, polyurethane, polyester, polyvinylchloride, nylon and polyethylene vinyl acetate. It is also preferred that the secondary backing not be comprised of hot melt adhesives. Good results may be obtained, when the secondary backing is a fluid-impervious polypropylene film having a thickness within the range of about 0.5 mils to about 10.0 mils, such as may be obtained from Quest Films, Inc. of Woodstock, Illinois, or a fluid-impervious polyester film of a similar thickness, such as may be obtained from Transitwrap of Richmond, Indiana.

Figure 3:
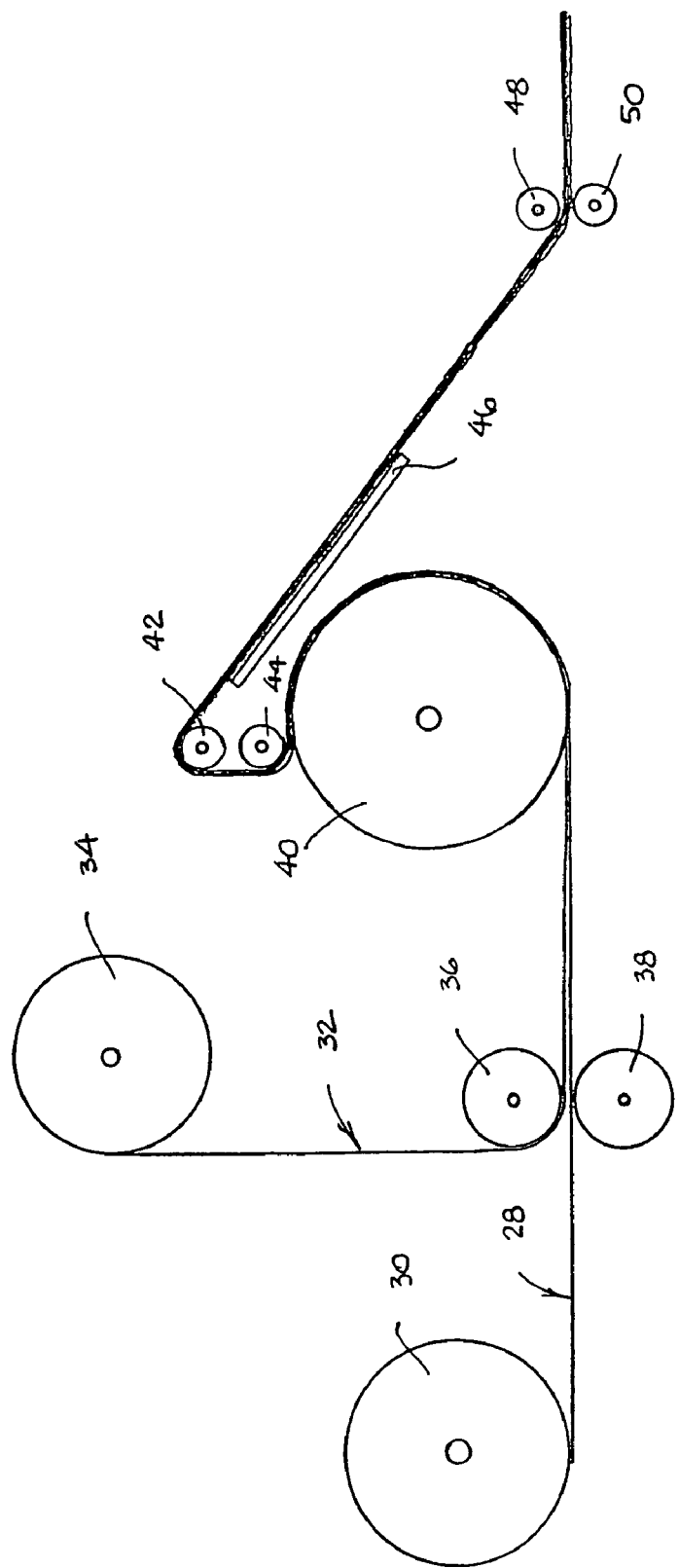
FIG. 3 is a schematic illustration of a first embodiment of a method for applying a secondary backing according to the invention to produce a carpet such as is illustrated in FIGS. 1 and 2.

FIG. 3 illustrates a preferred embodiment of an arrangement of equipment that may be used to apply a secondary backing comprising a fluid-impervious film or a fabric to the primary backing of carpet greige goods according to the invention to produce a carpet such as is illustrated in FIGS. 1 and 2. Thus, as shown therein, carpet greige goods 28 is supplied from roll 30. A secondary backing material 32 (which may be a film or a fabric) is supplied from roll 34 and directed by rollers 36 and 38 into contact with carpet greige goods 28. The greige goods and secondary backing 32 are then directed around heated laminating roller 40.

Roller 40 may be heated by steam or by hot oil or other means such as are known to those having ordinary skill in the art to which the invention relates. Rollers 42 and 44 maintain the carpet in close contact with the surface of roller 40 so that heat may be transmitted to the back stitches of the primary backing. Many such laminating rollers are capable of fine temperature control so that the yarn and the film or fabric may be selected to insure that the secondary backing bonds to the back stitches on the primary backing (without melting the secondary backing) as the carpet is carried around the heated roller. As shown in FIG. 3, the carpet with secondary backing bonded thereto is supported by support plate 46 and further controlled by rollers 48 and 50 as it comes off the heated roller.

When a secondary backing is bonded to the back stitches of the carpet using a heated roller such as roller 40 of FIG. 3, the material of the yarn and the material and thickness of the secondary backing should be selected and the temperature of the roller controlled so that the back stitches will soften or melt by transfer of heat from the roller before the secondary backing softens. The melting point of the yarn may be below the operating temperature of the heated roller, but of course, the melting point of any films or fabrics which comprise the secondary backing must be above such temperature.

Figure 4:
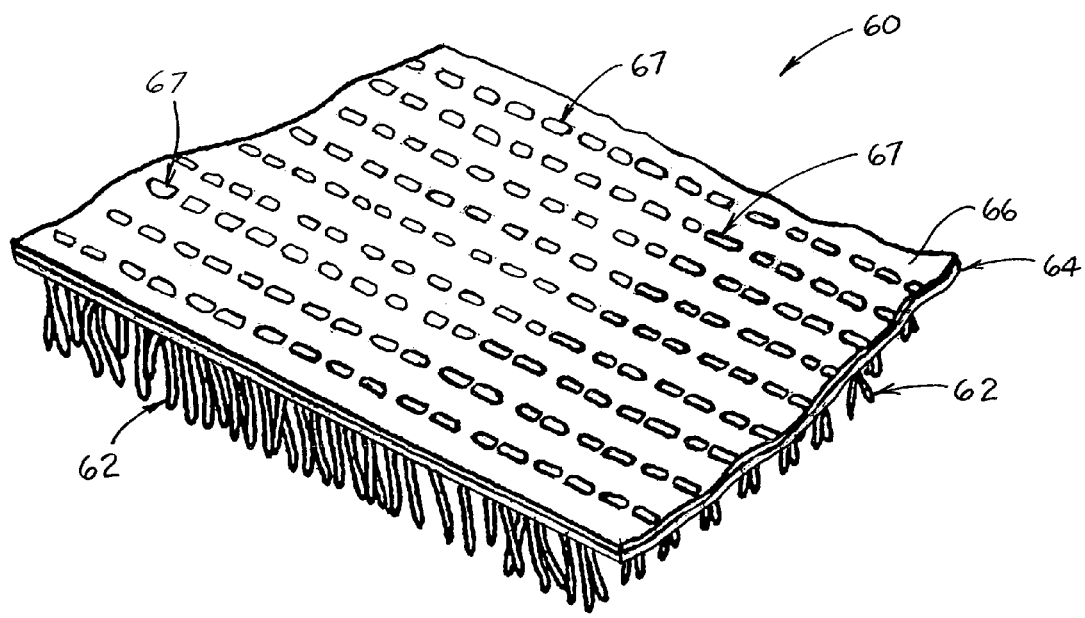
FIG. 4 is a perspective view showing a second embodiment of a piece of carpet that is made according to the present invention.

FIG. 4 illustrates a second embodiment of a carpet made according to the invention. As shown therein, carpet 60 comprises face yarns formed of a plurality of tufts 62, primary backing 64 and secondary backing 66. For clarity, secondary backing is illustrated as a transparent film, although this embodiment of the invention contemplates a use of other films and fabrics as well. The yarn comprises a thermoplastic material that is preferably selected from the group consisting of polymers and copolymers of nylon, polyethylene, polypropylene and polyester. Primary backing 64 has a face side (not shown in FIG. 4) and a back side, and the tufts 62 of yarns are sewn through the primary backing in the conventional manner. Secondary backing 66 comprises a thermoplastic material having a softening temperature that is no lower than, and preferably higher than, the melting point of yarn tufts 62. As shown in FIG. 4, the tufts 62 are exposed on the face side of the primary backing for forming face yarns and form a plurality of back stitches 67 (visible through transparent secondary backing 66) on the back side of the primary backing. As shown in FIG. 4, the back stitches are somewhat distorted in shape due to the fact that they have been softened while in contact with secondary backing 66 so as to adhere the secondary backing to the yarn of the back stitches.

Figure 5:
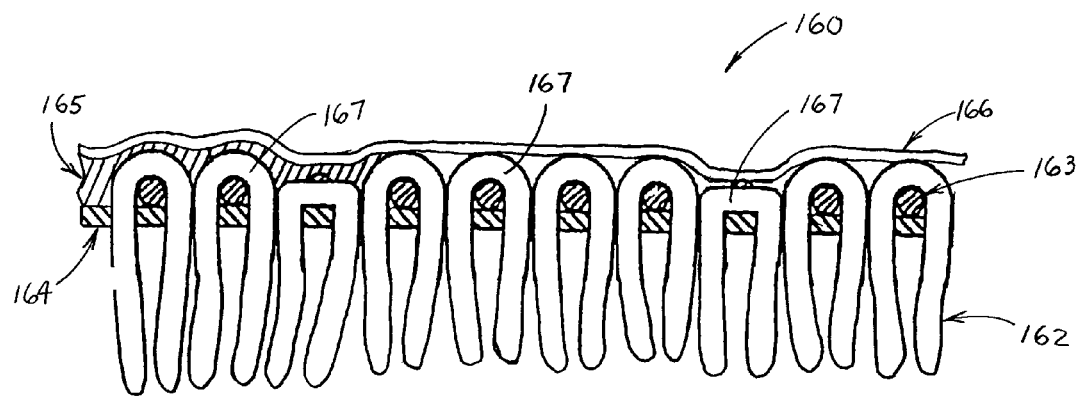
FIG. 5 is a detailed side view of a third embodiment of a piece of a carpet that is made according to the present invention.
Figure 6:
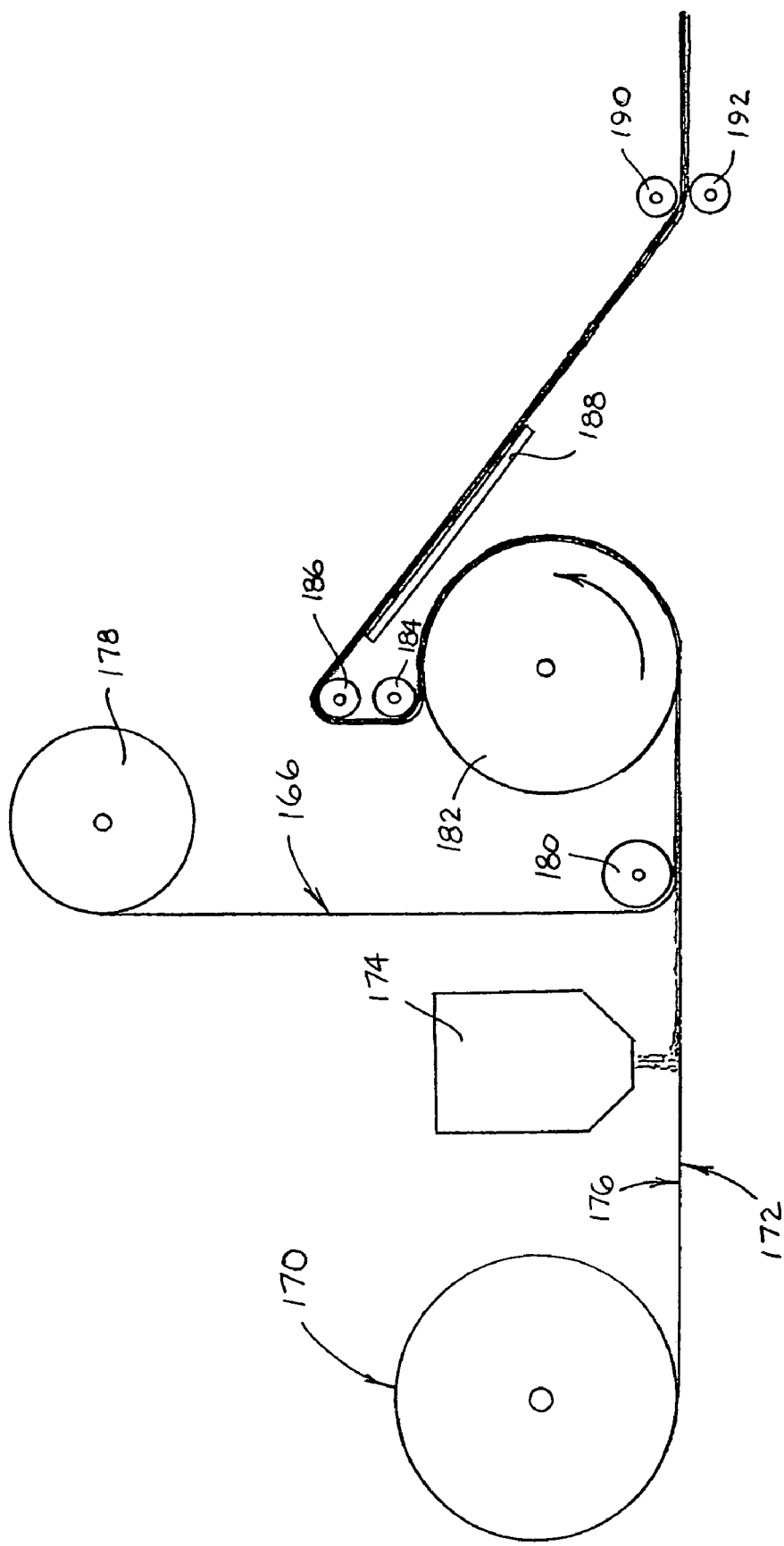
FIG. 6 is a schematic illustration of a second embodiment of a method for applying a secondary backing according to the invention to produce a carpet such as is illustrated in FIG. 5.

FIG. 5 illustrates a portion of a carpet that is made according to an embodiment of the invention which employs an adhesive layer between the primary backing and the secondary backing along an edge of the carpet portion in order to increase the structural integrity of the edge portion to allow for more secure seaming of the carpet portion with an adjacent portion. FIG. 6 illustrates a preferred embodiment of an arrangement of equipment that may be used to apply a secondary backing comprising a fluid-impervious film or a fabric to the primary backing of a carpet with an intermediate adhesive layer along the edge of the carpet according to the invention. As shown therein, carpet 160 comprises thermoplastic yarns formed of a plurality of tufts 162 which are sewn, in a conventional manner, through a two-layer primary backing comprising first layer 163 and second layer 164. Preferably, as shown in FIG. 5, first layer 163 is an open weave material, and second layer 164 is a woven or nonwoven layer. Of course, the invention may be carried out using other types of primary backings, including single layer backings.

Along the edge of this carpet portion, an adhesive layer 165 has been placed between the primary backing and secondary backing 166. Preferably, the adhesive layer comprises a layer of thermofusible particulate materials which have been heated and allowed to cure according to the invention. Suitable thermofusible particulate materials for use in connection with the invention include powders and granules of thermoplastic polymers such as polyethylene, ethylene vinyl acetate, ethylene vinyl acrylate, low-melting point polyamides and syndiotactic polypropylene. Such materials should have a melting point lower than that of the materials of either the first or second layer of the primary backing. Furthermore, the amount of particulate material used will depend on the carpet construction and the yarn face weight. Good results may be obtained when the adhesive layer comprises Epolene C10 brand polyethylene granules having a melt index of 2,250 at 190° C., which may be obtained from Eastman Chemical Company.

Secondary backing 166 comprises a thermoplastic material having a softening temperature that is no lower than, and preferably higher than, the melting point of yarn tufts 162. As shown in FIG. 5, the tufts 162 are exposed on the face side of the primary backing for forming face yarns and form a plurality of back stitches 167 on the back side of the primary backing.

As shown in FIG. 6, a roll 170 of carpet greige goods 172 made by tufting yarn through the primary backing of FIG. 5 is passed beneath an adhesive application station where a thermofusible material, preferably a thermoplastic adhesive powder, is dispensed from dispenser 174 onto one or both edges, preferably in a strip about six inches wide, on back side 176 of the primary backing. Secondary backing 166 comprised of a fluid impervious film or a fabric is directed from roll 178 by roller 180 into contact with the primary backing with the thermoplastic adhesive powder thereon, and into contact with and around heated laminating roller 182. Roller 182, similar to roller 40 of the embodiment of the invention illustrated in FIG. 3, may be heated by steam or by hot oil or other means such as are known to those having ordinary skill in the art to which the invention relates. Rollers 184 and 186 maintain the carpet in close contact with the surface of roller 182 so that heat may be transmitted through the secondary layer to the thermoplastic powder and the yarn back stitches between the secondary layer and the primary backing. The carpet with secondary backing bonded thereto is supported by support plate 188 and further controlled by rollers 190 and 192 as it comes off the heated roller.

Figure 7:
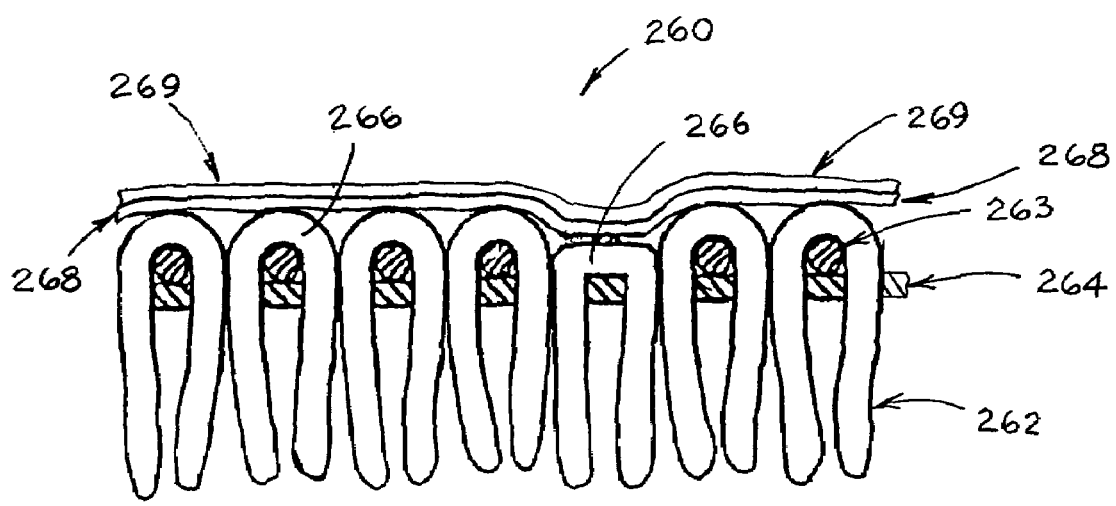
FIG. 7 is a perspective view showing a fourth embodiment of a piece of carpet that is made according to the present invention.

FIG. 7 illustrates a portion of a carpet that is made according to an embodiment of the invention which employs a secondary backing comprising a laminate. As shown therein, carpet 260 comprises yarns of thermoplastic material having a yarn melting point, said yarns forming a plurality of tufts 262 which are sewn, in a conventional manner, through a two-layer primary backing comprising first layer 263 and second layer 264. Preferably, as shown in FIG. 7, first layer 263 is an open weave material, and second layer 264 is a woven or nonwoven layer. Of course, the invention may be carried out using other types of primary backings, including single layer backings. Preferably, the thermoplastic material of the yarn is selected from the group consisting of polymers and copolymers of nylon, polyethylene, polypropylene and polyester. As shown in FIG. 7, the tufts 262 or yarn are exposed on the face side of the primary backing for forming face yarns and form a plurality of back stitches 266 on the back side of the primary backing.

The secondary backing of this embodiment of the invention is comprised of a laminate having an inner layer 268 and an outer layer 269. The outer layer comprises a thermoplastic material having a softening temperature that is no lower than the melting point of the thermoplastic material of the yarn. It is preferred that the secondary backing comprise a laminate in the form of (a) a film inner layer and a film outer layer, (b) a film inner layer and a fabric outer layer, (c) a fabric inner layer and a film outer layer, or (d) a fabric inner layer and a fabric outer layer. It is also preferred that the thermoplastic material of the outer layer of the laminate be selected from the group consisting of polyethylene, polypropylene, polyurethane, polyester, polyvinylchloride, nylon, and polyethylene vinyl acetate. It is also preferred that the outer layer of the laminate not be comprised of hot melt adhesives.

Figure 8:
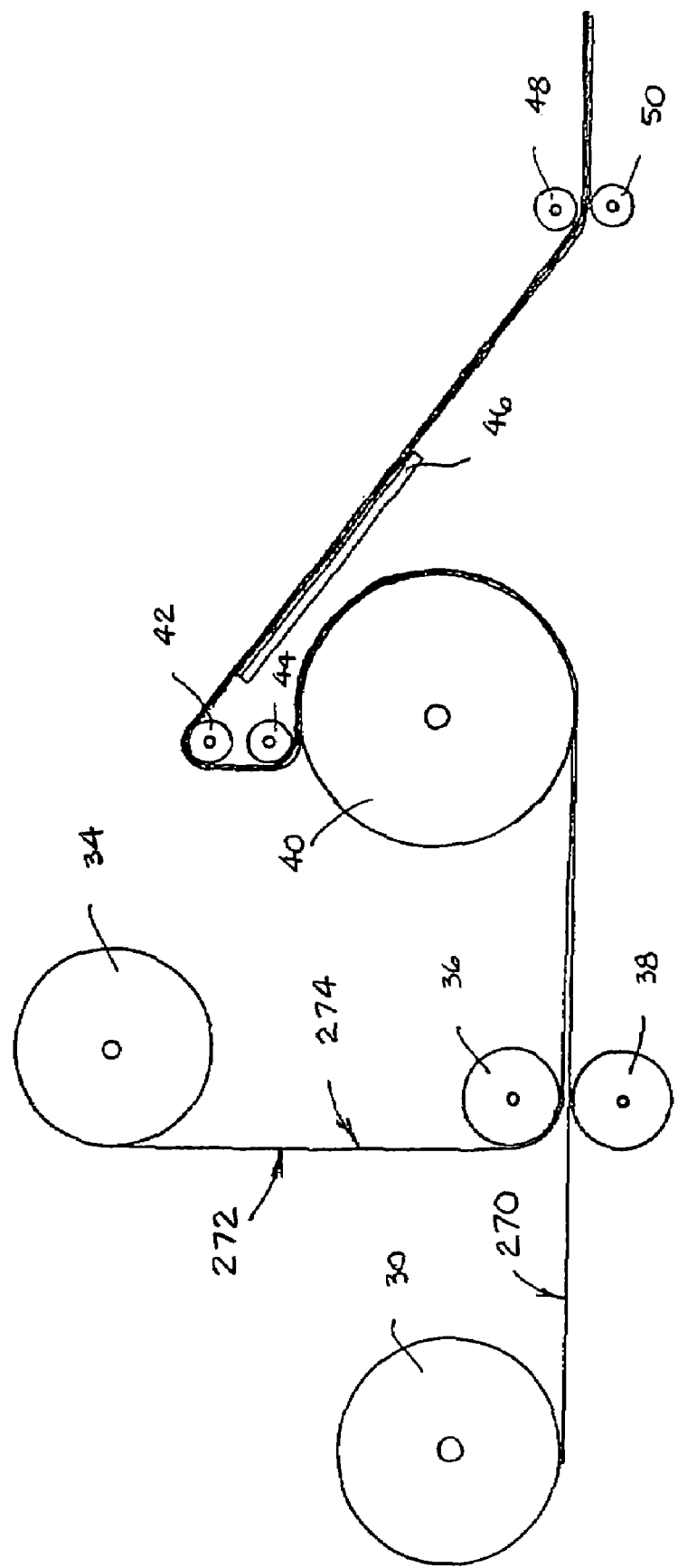
FIG. 8 is a schematic illustration of a third embodiment of a method for applying a secondary backing according to the invention to produce a carpet such as is illustrated in FIG. 7.

FIG. 8 illustrates a the arrangement of equipment shown in FIG. 3, as it may be used to apply a secondary backing comprising a laminate to the primary backing of carpet greige goods according to the invention to produce a carpet such as is illustrated in FIG. 7. Thus, as shown therein, carpet greige goods 270 is supplied from roll 30. A secondary backing material comprising a laminate having an inner layer 272 and an outer layer 274 is supplied from roll 34 and directed by rollers 36 and 38 into contact with carpet greige goods 270. The greige goods and secondary backing are then directed around heated laminating roller 40. As described in connection with the embodiment of the invention illustrated by FIGS. 1-3, roller 40 may be heated by steam or by hot oil or other means such as are known to those having ordinary skill in the art to which the invention relates. Rollers 42 and 44 maintain the carpet in close contact with the surface of roller 40 so that heat may be transmitted to the back stitches of the primary backing. The carpet with secondary backing bonded thereto is supported by support plate 46 and further controlled by rollers 48 and 50 as it comes off the heated roller.

Unlike hot air ovens normally used in the carpet latex backing process and infrared heating lamps typically used in powder melting processes, the use of heated drums as described herein provides more precise temperature control, thus allowing the use of many combinations of thermoplastic yarns, fabrics and films, so that precise heat can be applied to a carpet product to adhere the secondary backing to at least some of the back stitches without jeopardizing the fluid barrier properties of a film or the integrity of a fabric which comprise the secondary backing.

The following examples of various aspects of the invention are provided by way of illustration and not of limitation.

EXAMPLE 1

A secondary backing of COLBAC® fabric, No. WHD50, made by Colbond was adhered to the back stitches of a 32 ounce polyethylene monofilament synthetic grass carpet greige goods by passing the combination around a heated drum at 280° F. according to the embodiment of the invention illustrated in FIG. 3.

EXAMPLE 2

A secondary backing of an ActionBac® 3608 fabric (obtained from BP Amoco) was adhered to the back stitches of a 32 ounce polyethylene monofilament synthetic grass carpet greige goods by passing the combination around a heated drum at 280° F. according to the embodiment of the invention illustrated in FIG. 3.

EXAMPLE 3

A secondary backing comprising a 3 mil polypropylene film was adhered to the back stitches of a 32 ounce polyethylene monofilament synthetic grass carpet greige goods by passing the combination around a heated drum at 280° F. according to the embodiment of the invention illustrated in FIG. 3.

EXAMPLE 4

A secondary backing comprising a 5 mil polyester film was adhered to the back stitches of a 32 ounce polyethylene monofilament synthetic grass carpet greige goods by passing the combination around a heated drum at 280° F. according to the embodiment of the invention illustrated in FIG. 3.

EXAMPLE 5

A 32 ounce polyethylene yarn was tufted into a two-layer primary backing comprising a woven layer and a layer of an ActionBac® 3608 fabric according to the process of U.S. Pat. No. 5,962,101. A secondary backing comprising a Lutradur brand spunbonded polyester fabric obtained from The Freudenberg Nonwovens Group was adhered to the back stitches of the carpet by passing the combination around a heated drum at 280° F. according to the embodiment of the invention illustrated in FIG. 3.

EXAMPLE 6

A 32 ounce polyethylene yarn was tufted into a two-layer primary backing comprising a woven layer and a layer of a COLBAC® fabric. A secondary backing comprising a 5 mil polyester film was adhered to the back stitches of the carpet by passing the combination around a heated drum at 280° F. according to the embodiment of the invention illustrated in FIG. 3.

EXAMPLE 7

A 32 ounce polyethylene yarn was tufted into a two-layer primary backing comprising a woven layer and a layer of an ActionBac® 3608 fabric according to the process of U.S. Pat. No. 5,962,101. A secondary backing comprising a COLBAC® fabric, No. WHD50, was adhered to the back stitches of the carpet by passing the combination around a heated drum at 280° F. according to the embodiment of the invention illustrated in FIG. 3.

EXAMPLE 8

A 32 ounce polyethylene yarn was tufted into a two-layer primary backing comprising a woven layer and a layer of a COLBAC® fabric such as is described in U.S. Pat. No. 6,475,592. A secondary backing comprising a COLBAC® fabric, No. WHD50, was adhered to the back stitches of the carpet by passing the combination around a heated drum at 280° F. according to the embodiment of the invention illustrated in FIG. 3.

EXAMPLE 9

A 42 ounce polyethylene yarn was tufted into a Matrix™ primary backing obtained from Propex Fabric, Inc. A secondary backing comprising a 5 mil polyester film obtained from Transilwrap was adhered to the back stitches of the carpet by passing the combination around a heated drum at 280° F. according to the embodiment of the invention illustrated in FIG. 3.

EXAMPLE 10

A 42 ounce polyethylene yarn was tufted into a Matrix primary backing obtained from Propex Fabric, Inc. A secondary backing comprising a Lutradur brand spunbonded polyester fabric was adhered to the back stitches of the carpet by passing the combination around a heated drum at 280° F. according to the embodiment of the invention illustrated in FIG. 3.

EXAMPLE 11

Twelve ounces per square yard of Epolene C10 brand polyethylene granules having a melt index of 2,250 at 190° C. such as may be obtained from Eastman Chemical Company was applied to a six-inch peripheral edge on both sides of the primary backing of a 32 ounce polyethylene monofilament synthetic grass carpet greige goods. A secondary backing of COLBAC® fabric, No. WHD50, was adhered to the back stitches of the carpet by passing the combination around a heated drum at 280° F. according to the embodiment of the invention illustrated in FIG. 6.

Although this description contains many specifics, these should not be construed as limiting the scope of the invention but as merely providing illustrations of some of the presently preferred embodiments thereof, as well as the best mode contemplated by the inventors of carrying out the invention. The invention, as described herein, is susceptible to various modifications and adaptations, as would be understood by those having ordinary skill in the art to which the invention relates, and the same are intended to be comprehended within the meaning and range of equivalents of the appended claims.

What is claimed is:

1. A method for making tufted carpet comprising a primary backing having a back side and a face side and tufts of yarn sewn therein, said method comprising:
   (a) selecting a primary backing which does not include an adhesive component;
   (b) selecting a yarn to tuft through the primary backing, said yarn being comprised of a thermoplastic material having a yarn melting point;
   (c) tufting the selected yarn through said primary backing so as to form face yarns on the face side of the primary backing and a plurality of back stitches on the back side;
   (d) providing a secondary backing comprising:
      (i) a thermoplastic material in the form of a fluid-impervious film or a fabric having a softening temperature that is no lower than the yarn melting point; or
      (ii) a thermoplastic material in the form of a fabric having a softening temperature that is no lower than the yarn melting point; or
      (iii) a laminate having an inner layer and an outer layer, said outer layer comprising a thermoplastic material having a softening temperature that is no lower than the yarn melting point;
   (e) bringing the secondary backing into contact with at least some of the back stitches on the back side of the primary backing;
   (f) heating the combination of the primary backing and the secondary backing to a temperature sufficient to adhere the secondary backing to the yarn of the back stitches by passing the secondary backing around a heated drum to soften the yarn of the back stitches without melting the secondary backing.

2. The method of claim 1 which includes the following step instead of step (b) of claim 1:
   (b) selecting a yarn to tuft through the primary backing, said yarn being comprised of a thermoplastic material having a yarn melting point, said thermoplastic material being selected from the group consisting of polymers and copolymers of nylon, polyethylene, polypropylene and polyester.

3. The method of claim 1 which includes the following step instead of step (d) of claim 1:
   (d) providing a secondary backing comprising a thermoplastic material in the form of a fluid-impervious film having a softening temperature that is no lower than the yarn melting point or a thermoplastic material in the form of a fabric having a softening temperature that is no lower than the yarn melting point, said thermoplastic material being selected from the group consisting of:
      (i) polyethylene,
      (ii) polypropylene,
      (iii) polyurethane,
      (iv) polyester,
      (v) polyvinylchloride,
      (vi) nylon, and
      (vii) polyethylene vinyl acetate,
      (viii) but excluding hot melt adhesives.

4. The method of claim 1 which includes the following step instead of step (e) of claim 1:
   (e) bringing the secondary backing into contact with at least some of the back stitches on the back side of the primary backing without first applying a back coating to the back side of the primary backing.

5. The method of claim 1 which includes the following step instead of step (d) of claim 1:
   (d) providing a secondary backing comprising a laminate in the form of:
      (i) a film inner layer and a film outer layer; or
      (ii) a film inner layer and a fabric outer layer; or
      (iii) a fabric inner layer and a film outer layer; or
      (iv) a fabric inner layer and a fabric outer layer;
      wherein said outer layer comprises a thermoplastic material having a softening temperature that is no lower than the yarn melting point.

6. The method of claim 1 which includes the following step instead of step (d) of claim 1:
   (d) providing a secondary backing comprising a laminate having an inner and an outer layer, said outer layer comprising a thermoplastic material having a softening temperature that is no lower than the yarn melting point, said thermoplastic material being selected from the group consisting of:
      (i) polyethylene,
      (ii) polypropylene,
      (iii) polyurethane,
      (iv) polyester,
      (v) polyvinylchloride,
      (vi) nylon, and
      (vii) polyethylene vinyl acetate,
      (viii) but excluding hot melt adhesives.

* * * * *